US007294811B2

(12) United States Patent
Kawashima et al.

(10) Patent No.: US 7,294,811 B2
(45) Date of Patent: Nov. 13, 2007

(54) HEATING COOKING DEVICE

(75) Inventors: Takuya Kawashima, Tokyo (JP); Kenji Goto, Tokyo (JP); Nobuo Tanabe, Tokyo (JP)

(73) Assignee: Fujikura Ltd, Tokyo (JP)

( * ) Notice: Subject to any disclaimer, the term of this patent is extended or adjusted under 35 U.S.C. 154(b) by 0 days.

(21) Appl. No.: 11/312,546

(22) Filed: Dec. 21, 2005

(65) Prior Publication Data

US 2006/0138127 A1 Jun. 29, 2006

(30) Foreign Application Priority Data

Dec. 27, 2004 (JP) ............................ 2004-375107

(51) Int. Cl.
*A21B 3/00* (2006.01)
*A21B 3/02* (2006.01)
*H05B 3/26* (2006.01)
*H05B 3/28* (2006.01)

(52) U.S. Cl. ...................... 219/405; 219/391; 126/200

(58) Field of Classification Search .................... None
See application file for complete search history.

(56) References Cited

U.S. PATENT DOCUMENTS 4,455,479 A * 6/1984 Itoh et al. .................. 219/405
5,700,305 A * 12/1997 Lowe et al. ................ 427/162
6,024,084 A * 2/2000 Gerhardinger .............. 126/200
6,822,208 B2 * 11/2004 Henze et al. ............... 219/740
2003/0066825 A1 * 4/2003 Leutner et al. ............. 219/408
2003/0113550 A1 * 6/2003 Millett et al. .............. 428/432
2003/0228476 A1 * 12/2003 Buhay et al. .............. 428/469
2004/0253471 A1 * 12/2004 Thiel et al. ................ 428/544

FOREIGN PATENT DOCUMENTS

JP 2002-327927 A 11/2002
JP 2003323818 A * 11/2003

* cited by examiner

*Primary Examiner*—J. Pelham
(74) *Attorney, Agent, or Firm*—Sughrue Mion, PLLC

(57) ABSTRACT

A heating cooking device includes a housing having a wall portion; a first base material provided in at least a portion of the wall portion; and optionally a second base material formed on the first base material; a heat ray reflector formed on the conductive base material, including a first transparent conductive film formed on the first base material and a second transparent conductive film that is provided on the first transparent conductive film, where the second transparent conductive film has a higher heat resistance than that of the first transparent conductive film.

23 Claims, 3 Drawing Sheets

HEATING COOKING DEVICE

BACKGROUND OF THE INVENTION

1. Field of the Invention

The present invention relates to a heating cooking device, for example, a microwave oven or an electronic oven, utilizing a microwave or a heat ray heater.

Priority is claimed on Japanese Patent Application No. 2004-375107, filed Dec. 27, 2004, the content of which is incorporated herein by reference.

2. Description of the Related Art

Heating cooking devices, such as a microwave oven, are often provided with a conductive base material having a transparent conductive film on the door portion of the devices.

Materials that can be used for the transparent conductive film include indium oxide doped with several percent of tin, so-called indium tin oxide (hereinafter, referred to as "ITO"). A transparent conductive film made of ITO is highly transparent and exhibits excellent conductivity. Such materials are disclosed in Japanese Unexamined Patent Application, First Publication No. 2002-327927, for example.

However, when a transparent conductive film made of ITO is used in a heating cooking device, the heat ray reflecting property of the film may degrade, and the heating efficiency during cooking may be insufficient.

SUMMARY OF THE INVENTION

The present invention was conceived in light of the above-described circumstances, and an object thereof is to provide a heating cooking device having an enhanced heat ray reflecting property.

The heating cooking device in accordance with a first aspect of the present invention is a heating cooking device including: a housing having a wall portion comprising a conductive base material; a first base material provided in at least a portion of the wall portion; and, optionally, a second base material formed on the first base material; a heat ray reflector formed on the conductive base material, including a first transparent conductive film formed on the first base material; and a second transparent conductive film that is provided on the first transparent conductive film and has a higher heat resistance tan that of the first transparent conductive film.

In a second aspect of the heating cooking device of the present invention, in the above-described heating cooking device, the first transparent conductive film may be made of ITO.

In a third aspect of the heating cooking device of the present invention, in the above-described heating cooking device, the second transparent conductive film may be made of at least one member selected from the group consisting of fluorine-doped tin oxide, antimony-doped tin oxide, tin oxide, fluorine-doped zinc oxide, aluminum-doped zinc oxide, gallium-doped zinc oxide, boron-doped zinc oxide, and zinc oxide.

In a fourth aspect of the heating cooking device of the present invention, the conductive base material may be used for a window portion through which an inside of the housing can be observed.

In a fifth aspect of the heating cooking device of the present invention, in the above-described heating cooking device, the conductive base material may further include the optional second base material that is provided apart from the first base material with a predetermined space therebetween, and the heat ray reflector may be provided on a side facing the space of the first base material.

In a sixth aspect of the heating cooking device of the present invention, in the above-described heating cooking device, the second base material may be provided closer to the inside of the housing than to the first base material.

In a seventh aspect of the heating cooking device of the present invention, a cooling medium can be introduced within the space.

In the heating cooking device in accordance with the present invention, since the heat ray reflector is constructed to place the second transparent conductive film which has an excellent heat resistance above or on the first transparent conductive film so that the second transparent conductive film is closer to the heat source than the first transparent conductive film, deterioration of the heat ray reflecting property of the first transparent conductive film will not occur when it is exposed to high temperatures.

For example, when a transparent conductive film made of ITO is exposed to a high temperature of 300° C. or higher, oxygen in the air combines with a part of the oxygen-deficient structure. As a result, the oxygen vacancies that are the passages of electrons are reduced, causing a reduction in the conductivity.

In contrast, since the heating cooking device in accordance with the present invention is provided with the second transparent conductive film, oxygen in the air which comes in contact with the first transparent conductive film is reduced, thereby preventing oxidation of the first transparent conductive film.

Accordingly, it is possible to enhance the heat ray reflecting property and to improve the heating efficiency during cooking.

DETAILED DESCRIPTION OF THE INVENTION

The present invention will now be described in detail with reference to exemplary embodiments.

Figure 1:
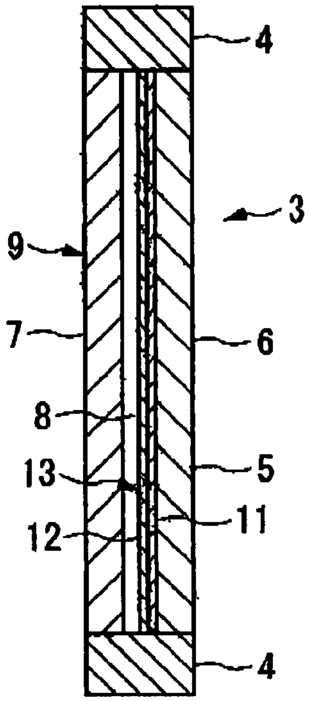
FIG. 1 is a cross-sectional view illustrating an example of a door portion of a cooking device according to the present invention.
Figure 2:
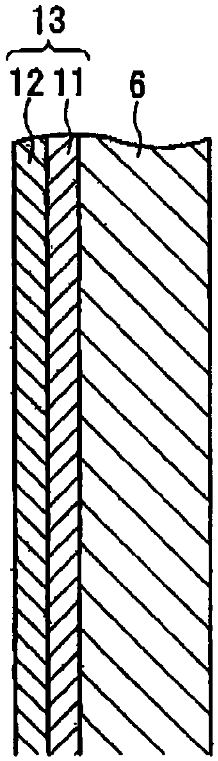
FIG. 2 is a cross-sectional view illustrating a principle portion of a conductive base material used in the door portion of the heating cooking device shown in FIG. 1.
Figure 3:
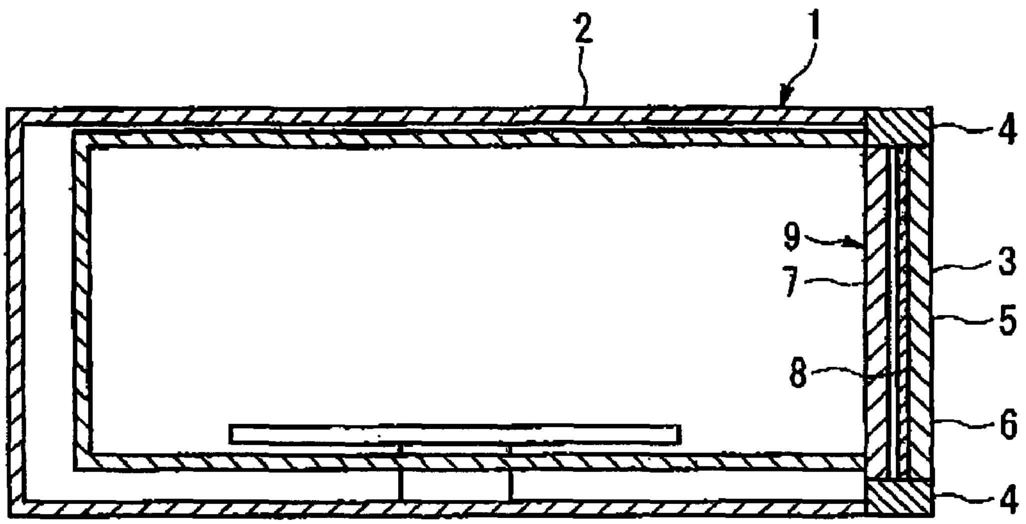
FIG. 3 is a cross-sectional view schematically illustrating the structure of the heating cooking device shown in FIG. 1.
Figure 4:
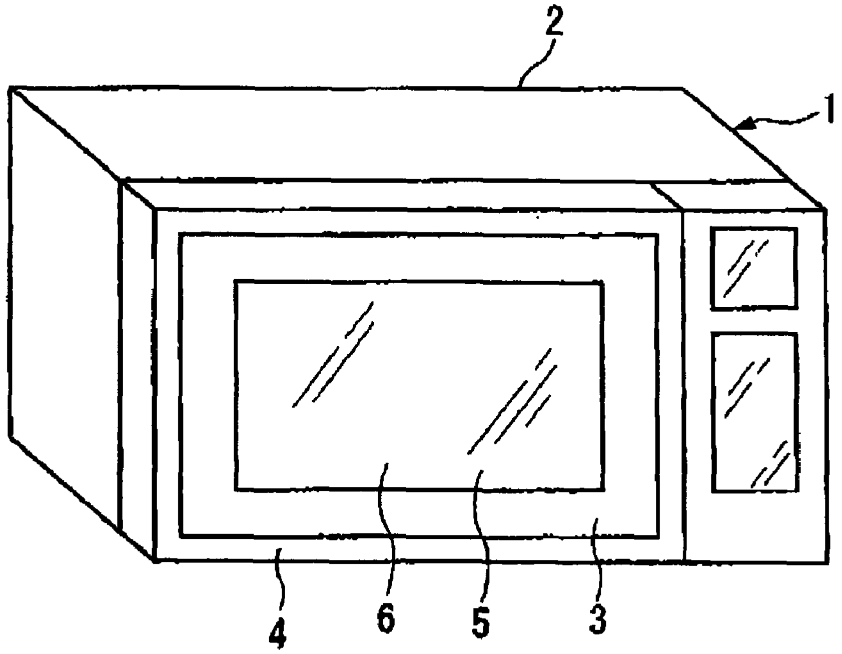
FIG. 4 is a perspective view of the heating cooking device shown in FIG. 1.

FIGS. 1 to 4 are views illustrating an example of the heating cooking device according to the present invention. FIG. 1 is a cross-sectional view illustrating a door portion of this heating cooking device. FIG. 2 is a cross-sectional view of a principle portion of the conductive base material used for the door portion. FIG. 3 is a cross-sectional view schematically illustrating the structure of this heating cooking device. FIG. 4 is a perspective view illustrating the external appearance of this heating cooking device.

As shown in FIGS. 3 and 4, a housing 1 of this heating cooking device includes a housing body 2 having a door portion 3 that is a wall portion for opening/closing the housing body 2.

The door portion 3 preferably includes a frame portion 4 and a window portion 5 through which the inside of the housing 1 can be observed.

As shown in FIGS. 1 and 3, the window portion 5 includes a conductive base material 9 having a double wall structure, wherein the conductive base material 9 includes a first base material 6 and a second base material 7 provided on the inner side of the fist base material 6 (on the side of the inside of the housing body 2).

The first and second base materials 6 and 7 are disposed substantially parallel to each other and are separated by a space 8.

The first and second base materials 6 and 7 are made, for example, of a transparent material, such as exemplary plates made of glass, for example, soda glass, heat-resistant glass, quartz glass, or the like.

The space 8 may have a thickness of, for example, between 1 mm and 20 mm.

As used herein, the terms "transparency" and "transparent" refer to a property of permitting transmission of visible light and having such a property, respectively.

As shown in FIGS. 1 and 2, a heat ray reflector 13 is provided on the inner side of the first base material 6 (the side facing the space 8).

The heat ray reflector 13 has a multi-layered structure and includes a first transparent conductive film 11 formed on the first base material 6, and a second transparent conductive film 12 provided on the upper side (the left side in FIG. 2) of the first transparent conductive film 11, which is represented in FIG. 2 as being the side closest to the space 8.

The first transparent conductive film 11, for example, is made of indium tin oxide (ITO). The first transparent conductive film 11 may have a thickness of between 100 nm and 1000 nm, inclusive.

The second transparent conductive film 12 is made of a material that has a higher heat resistance to that of the material of the first transparent conductive film 11.

Heat resistance of a material can be evaluated by measuring the rate of increase in the electrical resistance when heating the material at a temperature between 300° C. and 700° C., inclusive, for example, and the thus measured electrical resistance, for example, is higher than the electrical resistance measured at normal temperature (25° C.) by a factor of two or less.

The second transparent conductive film 12 is made, for example, of at least one member selected from the group consisting of fluorine-doped tin oxide (FTO), antimony-doped tin oxide (ATO), tin oxide (TO), fluorine-doped zinc oxide (FZO), aluminum-doped zinc oxide (AZO), gallium-doped zinc oxide (GZO), boron-doped zinc oxide (BZO), and zinc oxide (ZO).

Among these materials, FTO is exemplary since the electrical resistance of FTO is not increased significantly when exposed to high temperatures and FTO exhibits good heat resistance.

The second transparent conductive film 12 has a thickness, for example, of between 50 nm and 300 nm, inclusive, since the durability thereof decreases if it is too thin whereas the transparency deteriorates if it is too thick.

It should be noted that the first and second transparent conductive films 11 and 12 may contain other components than the above-described ones.

Next, a method for forming the first and second transparent conductive films 11 and 12 will be described.

The first and second transparent conductive films 11 and 12 may be formed using the spray pyrolysis deposition (SPD) method, sputtering methods, or CVD methods, and the SPD method is an exemplary method.

In the SPD method, a solution of the raw material is sprayed onto a base material that is then heated to cause a thermal decomposition reaction on the base material to generate oxide particles, thereby depositing the oxide particles on the surface of the base material.

The second transparent conductive film 12 is formed, for example, immediately after the first transparent conductive film 11 is formed since ITO, the exemplary material of the first transparent conductive film 11, is readily oxidized at high temperatures. The second transparent conductive film 12 is formed within one minute, for example, after the first transparent conductive film 11 is formed.

The above-described heating cooking device has the following advantages.

(1) Since the heat ray reflector 13 has a structure in which the second transparent conductive film 12 exhibiting excellent heat resistance is formed on the first transparent conductive film 11, the heat ray reflecting popery of the first transparent conductive film 11 does not deteriorate when it is exposed to high temperatures.

In general, when a transparent conductive film made of ITO is exposed to a high temperature of 300° C. or higher, oxygen in the air combines with a past of an oxygen-deficient structure. As a result, oxygen vacancies that allow passage of electrons are reduced, causing a decreased in the conductivity.

In contrast, since the above-described heating cooking device has the second transparent conductive film 12, oxygen in the air which comes in contact with the first transparent conductive film 11 is reduced, thereby preventing oxidation of the first transparent conductive film 11.

Accordingly, it is possible to enhance the heat ray reflecting property and improve the heating efficiency during cooking.

(2) Since the first transparent conductive film 11 can be made of ITO, i.e., a material having excellent heat ray reflecting property, electrical resistance, and transparency, it is possible to obtain the heat ray reflector 13 exhibiting these excellent characteristics. (3) Since the second transparent conductive film 12 is made of at least one member selected from the group consisting of FTO, ATO, TO, FZO, AZO, GZO, BZO, and ZO, it is possible to impart sufficient heat resistance to the heat ray reflector 13. Thus, deterioration of various characteristics of the first transparent conductive film 11 (the heat ray reflecting property, the electrical resistance, transparency, or the like) can be prevented.

Although the above-described materials, such as FTO, often exhibit an inferior electrical resistance and transparency, since the thickness of the second transparent conductive film 12 can be reduced when the first transparent conductive film 11 made of ITO is used, it is possible to minimize an increase in the electrical resistance and the transparency.

(4) Since the conductive base material 9 is used for the window portion 5, a sufficient heating efficiency is obtained in the window portion 5 without the heat ray reflecting property being deteriorated.

(5) Since the conductive base material 9 includes the first and second base materials 6 and 7 that are separated by the space 8 therebetween, the space 8 functions as a heating insulating layer.

Accordingly, (6) since it is possible to minimize the heat conduction from the second base material 7 to the first base material 6, the first base material 6 is prevented from becoming heated to high temperatures.

Accordingly, it is possible to improve safety while enhancing usability.

Furthermore, since the heat ray reflector 13 provided on the first base material 6 is protected from exposure to high temperatures, it is possible to prevent the degradation of the properties of the heat ray reflector 13.

Although the heat ray reflector 13 having the two transparent conductive films 11 and 12 is exemplified in the embodiment shown in FIGS. 1 and 2, the heat ray reflector may also include three or more transparent conductive films.

When three or more transparent conductive films are provided, ITO may be used for at least one of the transparent conductive films other than the outermost one, and one of the materials exemplified as the materials for the above-described second transparent conductive film, such as FTO, may be used for transparent conductive films provided above this transparent conductive film made of ITO.

Furthermore, although the heat ray reflector 13 is provided on the inner side of the first base material 6 in the embodiment shown in FIGS. 1 and 2, two beat ray reflectors may be provided both on the inner side of the first base material 6 and the outer side of the second base material 7 in accordance with the present invention, alternatively, one heat ray reflector may be provided only on the outer side of the second base material 7.

Furthermore, although the conductive base material 9 includes two or more base materials 6 and 7 in the embodiment shown in FIGS. 1 and 2, more or less base materials may be provided, and the number of the base materials may be one, two, or more than two.

Furthermore, the conductive base material may be used for the housing body 2, in addition to the door portion 3.

A cooling medium may be used in the space 8. In other words, the cooling medium may be sealed in the space 8, or a cooling medium circulation mechanism may be provided that makes the cooling medium circulate within the space 8.

The cooling medium may be, for example, either gaseous or liquid. Exemplary gaseous cooling media are air, nitrogen, and an inactive gas, and exemplary liquid cooling media are a silicone oil and water.

When a gaseous cooling medium is used, a gas-supply device, such as a fan or the like, may be used as a cooling medium circulation mechanism.

Figure 5:
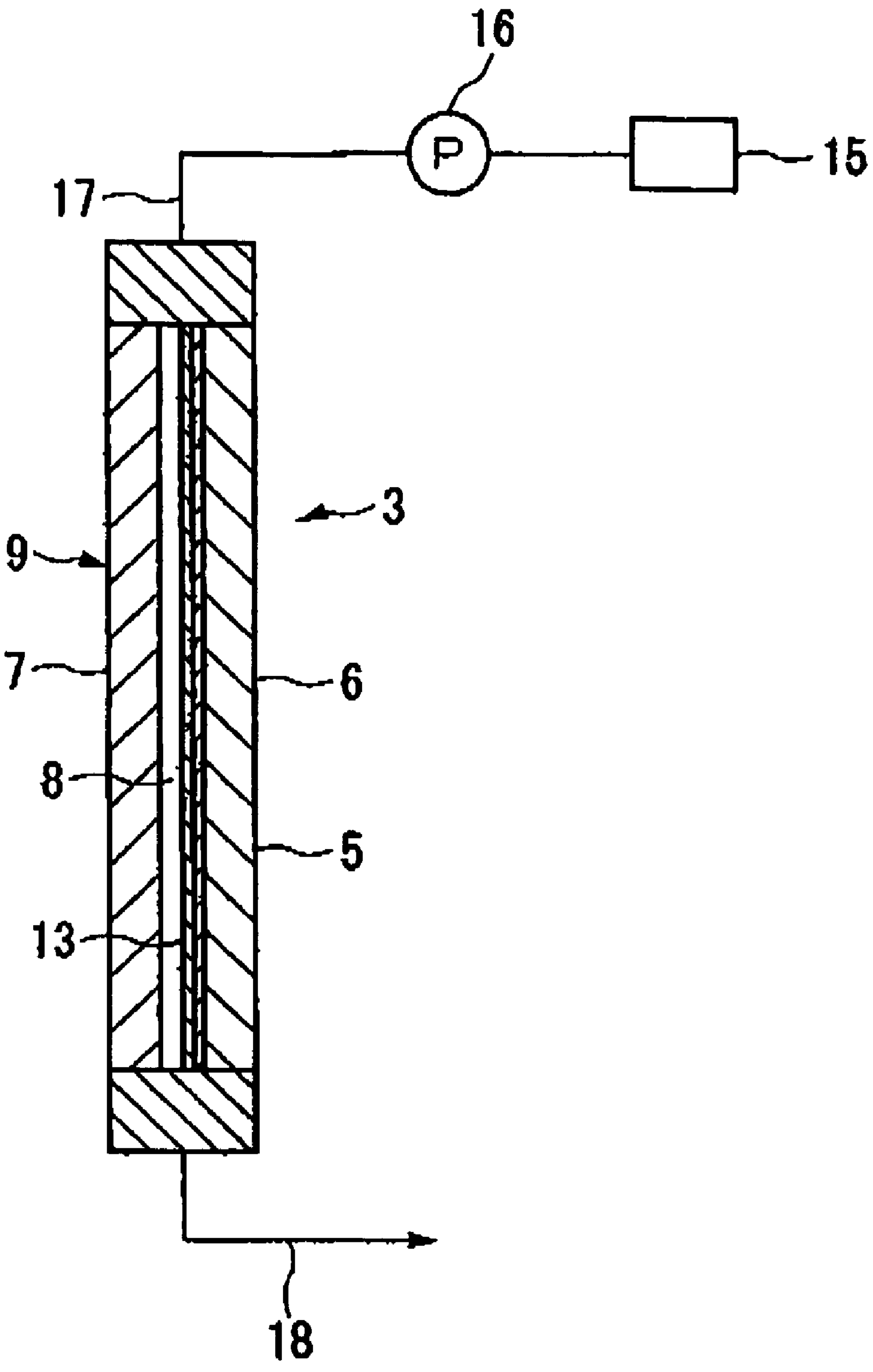
FIG. 5 is a diagram schematically illustrating the she of a cooling medium circulation mechanism that may be used in the heating cooking device according to the present invention.

When the cooling medium is liquid, as in the example shown in FIG. 5, the cooling medium circulation mechanism may be a device including a source 15 of the cooling medium, a liquid feeding pump 16 (delivering device) for delivering the cooling medium, an inlet channel 17 for guiding the cooling medium into the space 8, and an outlet channel 18 for discharging the cooling medium that has passed through the space 8.

By allowing the entry of the cooling medium into the space 8, it is possible to prevent the first base material 6 from becoming heated to high temperatures, thereby ensuring usability and safety of the cooking apparatus.

Furthermore, since the heat ray reflector 13 provided on the first base material 6 is protected from exposure to high temperatures, it is possible to prevent deterioration of the properties of the heat ray reflector 13.

EXAMPLES

Experimental Example 1

(1) Preparation of ITO Raw Material Solution 5.02 grams of indium chloride (III) tetrahydrate ($InCl_3.4H_2O$, formula weight: 293.24) and 0.21 grams of tin chloride (III) dihydrate ($SnCl_2.2H_2O$, formula weight: 225.65) were dissolved in 60 ml of ethanol to prepare an ITO raw material solution.

(2) Preparation of FTO Raw Material Solution 0.701 grams of tin chloride (IV) pentahydrate ($SnCl_4.5H_2O$, formula weight: 350.60) was dissolved in 10 ml of ethanol, to which 0.592 grams of a saturated solution of ammonium fluoride ($NH_4F$, formula weight: 37.04) was added. The mixture was completely dissolved for about 20 minutes while being placed in an ultrasonic washing machine to obtain an FTO raw material solution.

As the first base material 6, a heat-resistant glass plate having a thickness of 2 mm was heated, and when the temperature reached 350° C., the ITO raw material solution was sprayed from a nozzle having a diameter of 0.3 mm at a pressure of 0.06 MPa. Upon spraying, the distance between the nozzle and the first base material 6 was set to 400 mm.

After spraying the ITO raw material solution, the first base material 6 was further heated, and when the temperate reached to 400° C., the FTO raw material solution was sprayed. The spraying conditions for the FTO solution of the raw material were the same as the spraying conditions of the ITO raw material solution.

In the above procedures, the conductive base material 9 was obtained that includes the heat ray reflector 13 made of an ITO film having a thickness of 900 nm (the first transparent conductive film 11) and an FTO film having a thickness of 100 nm (the second transparent conductive film 12) on the first base material 6.

Experimental Example 2

For comparison, a conductive base material was prepared by forming only an ITO film having a thickness of 1000 nm on a heat-resistant glass plate similar to the one used in Experimental Example 1.

Infrared radiation (heat ray) was radiated on the conductive base materials of Experimental Examples 1 and 2 using a mid-into lamp to heat the samples to 400° C. to evaluate the heat ray reflecting property of the samples. The heat ray reflecting property of the samples was evaluated by measuring reflectivity of light at a wavelength of 2000 nm using a spectro-photometer.

Furthermore, the electrical resistance was measured with the four-probe method, and the transmittance of the samples was measured using an ultraviolet and visible spectrophotometer with light of a wavelength of 550 nm to evaluate transparency.

The results are listed in Table 2. Table 1 lists the pre-heating measurements and Table 2 lists the post-heating measurements.

TABLE 1

| | Material | Sheet Resis. (Ω/□) | Film Thick-ness (nm) | Specific Resis. (Ω · cm) | Trans-mittance (%) at 550 nm | Reflect-ivity (%) at 2000 nm |
|---|---|---|---|---|---|---|
| Exp. Ex. 1 | FTO-ITO | 1.4 | 1000 | $1.4 \times 10^{-4}$ | 88 | 82 |
| Exp. Ex. 2 | ITO | 1.3 | 1000 | $1.3 \times 10^{-4}$ | 90 | 83 |

TABLE 2

| | Material | Sheet Resis. (Ω/□) | Film Thick-ness (nm) | Specific Resis. (Ω · cm) | Trans-mittance (%) at 550 nm | Reflect-ivity (%) at 2000 nm |
|---|---|---|---|---|---|---|
| Exp. Ex. 1 | FTO-ITO | 1.4 | 1000 | $1.4 \times 10^{-4}$ | 88 | 82 |
| Exp. Ex. 2 | ITO | 5.3 | 1000 | $5.3 \times 10^{-4}$ | 90 | 45 |

The results listed in Tables 1 and 2 indicate that the heat caused a significant deterioration of the heat ray reflectivity in Experimental Example 2 in which only an ITO film was used, whereas the heat ray reflectivity was hardly affected by the heat in Experimental Example 1 in which a heat ray reflector 13 having an ITO film and an FTO film stacked thereon was used.

Furthermore, the electrical resistance (i.e., the sheet resistance and the specific resistance) increased about four times compared to the pre-heating electrical resistance in Experimental Example 2 after heating in which the ITO film was used, whereas the electrical resistance hardly increased in Experimental Example 1.

Furthermore, it was observed that the transparency hardly deteriorated in Experimental Example 1.

Experimental Example 3

A heating cooking device having a conductive base material made of a first base material and a second base material was manufactured.

The first and second base materials were staked together without a gap therebetween.

The temperature of the outer surface of the first base material was measured when the internal temperature of the housing 1 was raised to 400° C. The results are listed in Table 3.

Experimental Example 4

A heating cooking device was manufactured in the manner similar to Experimental Example 3 except that the fit and second base materials 6 and 7 were spaced apart with the space 8 therebetween, as shown in FIG. 1.

The temperature of the outer surface of the first base material 6 was measured when the internal temperature of the housing 1 was raised to 400° C. The results are listed in Table 3.

Experimental Example 5

A heating cooking device similar to that of Experimental Example 4 was manufactured, and the temperature of the outer surface of the first base material 6 was measured when the internal temperature of the housing 1 was raised to 400° C. while circulating the air in the space 8 with a fan. The results are listed in Table 3.

Experimental Example 6

A heating cooking device similar to that of Experimental Example 4 was manufactured, and the temperature of the outer surface of the first base material 6 was measured when the internal temperature of the housing 1 was raised to 400° C. while circulating a silicone oil in the space 8. The results are listed in Table 3.

TABLE 3

| | Structure of Conductive Material | | Temp. of First Base |
|---|---|---|---|
| | Space | Cooling medium | Material (° C.) |
| Exp. Exam. 3 | None | None | 320 |
| Exp. Exam. 4 | Yes | None | 90 |
| Exp. Exam. 5 | Yes | Air | 70 |
| Exp. Exam. 6 | Yes | Silicone oil | 55 |

The results in Table 3 indicate that provision of the space 8 between the first base material 6 and the second base material 7 prevented the first base material 6 from becoming heated to high temperatures.

Furthermore, circulation of a cooling medium inside the space 8 helped to keep the first base material 6 at lower temperatures. Especially when silicone oil was used as a cooling medium, the first base material 6 was kept at a lower temperature.

The present invention is applicable to a heating cooking device, for example, a microwave oven, or electronic oven, employing a microwave or a heat ray heater.

While exemplary embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A heating cooking device comprising a housing comprising a wall portion; where the wall portion comprises a conductive base material comprising a first base material, and a first heat ray reflector comprising a first transparent conductive film provided on the first transparent conductive film, where the second transparent conductive film has a higher heat resistance than that of the first transparent conductive film, wherein the first transparent conductive film comprises indium tin oxide (ITO) having a thickness of between 100 nm and 1000 nm, inclusive.

2. A healing cooking device comprising a housing comprising a wall portion; where the wall portion comprises a conductive base material comprising a first base material, and a first heat ray reflector comprising a first transparent conductive film formed on the first page material and a second transparent conductive film provided on the first transparent conductive, where the second transparent conductive film has a higher heat resistance than that of the first transparent conductive film, wherein the first transparent conductive film comprises indium tin oxide, and the second transparent conductive film has a thickness between 50 and 300 nm, inclusive.

3. The heating cooking device according to claim 1 or 2, wherein the second transparent conductive film comprises at least one member selected from the group consisting of fluorine-doped tin oxide, antimony-doped tin oxide, tin oxide, fluorine-doped zinc oxide, aluminum-doped zinc oxide, gallium-doped zinc oxide, boron-doped zinc oxide, and zinc oxide.

4. The heating cooking device according to claim 1 or 2, wherein the conductive base material is transparent and provides for a window portion through which an inside of the housing can be observed.

5. The heating cooking device according to claim 1 or 2, wherein the conductive base material further comprises a second base material which forms a space separating the second base material from the first base material, and wherein the first heat ray reflector is provided on an inner side of the first base material.

6. The heating cooking device according to claim 5, wherein the second base material is provided closer to the inside of the housing than the first base material.

7. The heating cooking device according to claim 5, wherein the space comprises a cooling medium.

8. The heating cooking device according to claim 1 or 2, wherein the wall portion comprises a frame portion.

9. The heating cooking device according to claim 1 or 2, wherein the second transparent conductive film prevents oxidation of the first transparent conductive film.

10. The heating cooking device according to claim 5, wherein the first and second base materials are disposed parallel to each other.

11. The heating cooking device according to claim 5, wherein the first and second base materials comprise a transparent material.

12. The heating cooking device according to claim 5, wherein the first and second base materials are made of glass.

13. The heating cooking device according to claim 5, wherein the space has a thickness between 1 mm and 20 mm, inclusive.

14. The heating cooking device according to claim 1 or 2, wherein the second transparent conductive film is made of a material having a heat resistance measured by a rate of increase in the electrical resistance when the material is heated to a temperature between 300.degree. C. and 700.degree. C., inclusive, and the measured electrical resistance is higher than the electrical resistance measured at normal temperature (25.degree. C.) by a factor of two or less.

15. The heating cooking device according to claim 1 or 2, wherein the second transparent conductive film comprises fluorine-doped tin oxide (FTO).

16. The heating cooking device according to claim 1 or 2, wherein the first and second transparent conductive films are formed by spray pyrolysis (SPD) method, sputtering methods, or CVD methods.

17. The heating cooking device according to claim 1 or 2, wherein the second transparent conductive film is formed within one minute after the first transparent conductive film is formed.

18. The heating cooking device according to claim 5, wherein the space functions as a heat insulating layer.

19. The heating cooling device according to claim 1 or 2, wherein the first heat ray reflector comprises at least one more transparent conductive film.

20. The heating cooking device according to claim 5, further comprising a second heat ray reflector located on an outer side of the second base material.

21. The heating cooking device according to claim 1 or 2, further comprising at least one additional base material.

22. The heating cooking device according to claim 7, wherein the cooling medium is gas or liquid and may be sealed or circulated within the space.

23. The heating cooking device according to claim 7, further comprising a cooling medium circulation mechanism.

* * * * *